US011092270B2

(12) United States Patent
Noda

(10) Patent No.: US 11,092,270 B2
(45) Date of Patent: Aug. 17, 2021

(54) ELBOW-EQUIPPED EXPANSION JOINT

(71) Applicant: THE VICTAULIC COMPANY OF JAPAN LIMITED, Tokyo-to (JP)

(72) Inventor: Yuji Noda, Kusatsu (JP)

(73) Assignee: THE VICTAULIC COMPANY OF JAPAN LIMITED, Tokyo (JP)

( * ) Notice: Subject to any disclaimer, the term of this patent is extended or adjusted under 35 U.S.C. 154(b) by 121 days.

(21) Appl. No.: 16/462,250

(22) PCT Filed: Nov. 17, 2017

(86) PCT No.: PCT/JP2017/041527
§ 371 (c)(1),
(2) Date: May 20, 2019

(87) PCT Pub. No.: WO2018/092893
PCT Pub. Date: May 24, 2018

(65) Prior Publication Data
US 2019/0338875 A1     Nov. 7, 2019

(30) Foreign Application Priority Data

Nov. 18, 2016 (JP) .............................. JP2016-225384

(51) Int. Cl.
*F16L 27/08* (2006.01)
*F16L 27/12* (2006.01)

(52) U.S. Cl.
CPC ..... *F16L 27/0841* (2013.01); *F16L 27/12751* (2019.08)

(58) Field of Classification Search
CPC ..... F16L 27/125; F16L 27/12; F16L 27/0837; F16L 27/0841; F16L 27/0845; F16L 27/026; F16L 27/023
(Continued)

(56) References Cited

U.S. PATENT DOCUMENTS 672,598 A  *  4/1901  Drew .................... F16L 41/086
                                                    285/136.1
1,352,102 A  *  9/1920  Tatro ................... F16L 27/0841
                                                    285/181
(Continued)

FOREIGN PATENT DOCUMENTS

DE        2641504 A1      3/1978
DE   202012104261 U1  *  2/2014 .......... F16L 27/0849
(Continued)

OTHER PUBLICATIONS

Feb. 6, 2018 International Search Report issued in International Patent Application No. PCT/JP2017/041527.
(Continued)

*Primary Examiner* — David Bochna
(74) *Attorney, Agent, or Firm* — Oliff PLC

(57) ABSTRACT

An elbow-equipped expansion joint, even when there is an axial and lateral displacement between a first pipe and a second pipe, can absorb the displacement and connect the first pipe and the second pipe. The elbow-equipped expansion joint includes: an expandable joint including a first sleeve and a second sleeve; and a pair of rotatable elbows joined to both ends of the expandable joint. The elbows each include one elbow pipe, and the other elbow pipe rotatably joined to the one elbow pipe. The bend angle of each elbow can be changed by rotating the other elbow pipe.

5 Claims, 8 Drawing Sheets

(58) Field of Classification Search
USPC .................................................. 285/302, 181
See application file for complete search history.

(56) References Cited

U.S. PATENT DOCUMENTS

| | | | |
|---|---|---|---|
| 1,704,003 A | | 3/1929 | Johnson |
| 2,479,580 A | * | 8/1949 | Marge ................ F16L 27/0849 285/331 |
| 5,044,674 A | * | 9/1991 | Hendrickson ....... F16L 27/0845 285/147.1 |
| 5,740,839 A | * | 4/1998 | Kuo .................... F16L 27/0861 138/120 |
| 7,699,355 B2 | * | 4/2010 | Vitel .................... F16L 27/0849 285/184 |
| 7,914,053 B2 | * | 3/2011 | Keller .................. F16L 23/036 285/365 |
| 8,328,245 B2 | * | 12/2012 | Gayer ................ F16L 23/0283 285/415 |
| 8,991,873 B2 | * | 3/2015 | Weinhold ................ F16L 27/12 285/145.1 |
| 9,689,518 B2 | * | 6/2017 | Gayer .................... F16L 41/008 |

FOREIGN PATENT DOCUMENTS

| | | | | |
|---|---|---|---|---|
| DE | 102014220007 A1 | * | 4/2016 | ............ F16L 37/133 |
| FR | 964665 A | * | 8/1950 | .......... F16L 27/0841 |
| FR | 2613818 A1 | | 10/1988 | |
| GB | 292782 A | * | 6/1928 | .......... F16L 27/0841 |
| GB | 389089 A | * | 3/1933 | .......... F16L 27/0845 |
| JP | S50-21688 B1 | | 7/1975 | |
| JP | S62-133083 U | | 8/1987 | |
| JP | H02-040385 Y2 | | 10/1990 | |
| JP | H03-285137 A | | 12/1991 | |
| JP | H05-1088 U | | 1/1993 | |
| JP | H05-164279 A | | 6/1993 | |
| JP | 2002-267044 A | | 9/2002 | |
| JP | 2004-10355 A | | 1/2004 | |
| JP | 2004-53317 A | | 2/2004 | |
| JP | 2004-150491 A | | 5/2004 | |
| JP | 2005-91215 A | | 4/2005 | |
| JP | 2014-156920 A | | 8/2014 | |

OTHER PUBLICATIONS

May 21, 2019 International Preliminary Report on Patentability issued in International Patent Application No. PCT/JP2017/041527.

Apr. 16, 2020 Office Action issued in Chinese Patent Application No. 201780066075.1.

Sep. 24, 2020 Office Action issued in Korean Patent Application No. 10-2019-7013810.

* cited by examiner

ELBOW-EQUIPPED EXPANSION JOINT

TECHNICAL FIELD

The present invention relates to an elbow-equipped expansion joint for connecting a first pipe and a second pipe, and more particularly to an elbow-equipped expansion joint which can securely connect a first pipe and a second pipe even when there is a displacement between the first pipe and the second pipe.

BACKGROUND ART

Expansion joints for connecting a first pipe and a second pipe are known in the art.

Even when there is some axial displacement between a first pipe and a second pipe, an expansion joint can absorb the displacement and connect the first pipe and the second pipe in an appropriate fashion.

In contrast, when there is a lateral displacement between a first pipe and a second pipe, it is difficult to absorb the lateral displacement and connect the first pipe and the second pipe.

CITATION LIST

Patent Literature

Patent document 1: Japanese Patent Laid-Open Publication No. H3-285137
Patent document 2: Japanese Patent Laid-Open Publication No. 2005-91215
Patent document 3: Japanese Patent Laid-Open Publication No. 2004-53317
Patent document 4: Japanese Patent Laid-Open Publication No. 2004-10355

SUMMARY OF THE INVENTION

Problems to be Solved by the Invention

The present invention has been made in view of the above situation. It is therefore an object of the present invention to provide an elbow-equipped expansion joint which, even when there is some axial and lateral displacement between a first pipe and a second pipe, can absorb the displacement and securely connect the first pipe and the second pipe.

Means for Solving the Problems

The present invention provides an elbow-equipped expansion joint comprising: an expandable joint including a first sleeve, and a second sleeve which is slidable with respect to the first sleeve; and rotatable elbows joined to both ends of the expandable joint, wherein each elbow includes one elbow pipe, and the other elbow pipe rotatably joined to the one elbow pipe, wherein the bend angle of each elbow is determined by the rotational position of the other elbow pipe with respect to the one elbow pipe, and wherein the first sleeve and the second sleeve can be fixed by fixing bolts which connect the first sleeve and the second sleeve.

In a preferred embodiment of the present invention, a joining area between the one elbow pipe of each elbow and the other elbow pipe is covered with a first packing which is held by a dividable first housing.

In a preferred embodiment of the present invention, a joining area between the expandable joint and each elbow is covered with a second packing which is held by a dividable second housing.

Advantageous Effects of the Invention

Even when there is an axial and lateral displacement between a first pipe and a second pipe, the elbow-equipped expansion joint according to the present invention can absorb the displacement and securely connect the first pipe and the second pipe.

DESCRIPTION OF THE EMBODIMENTS

An elbow-equipped expansion joint according to the present invention will now be described with reference to the drawings.

Figure 1:
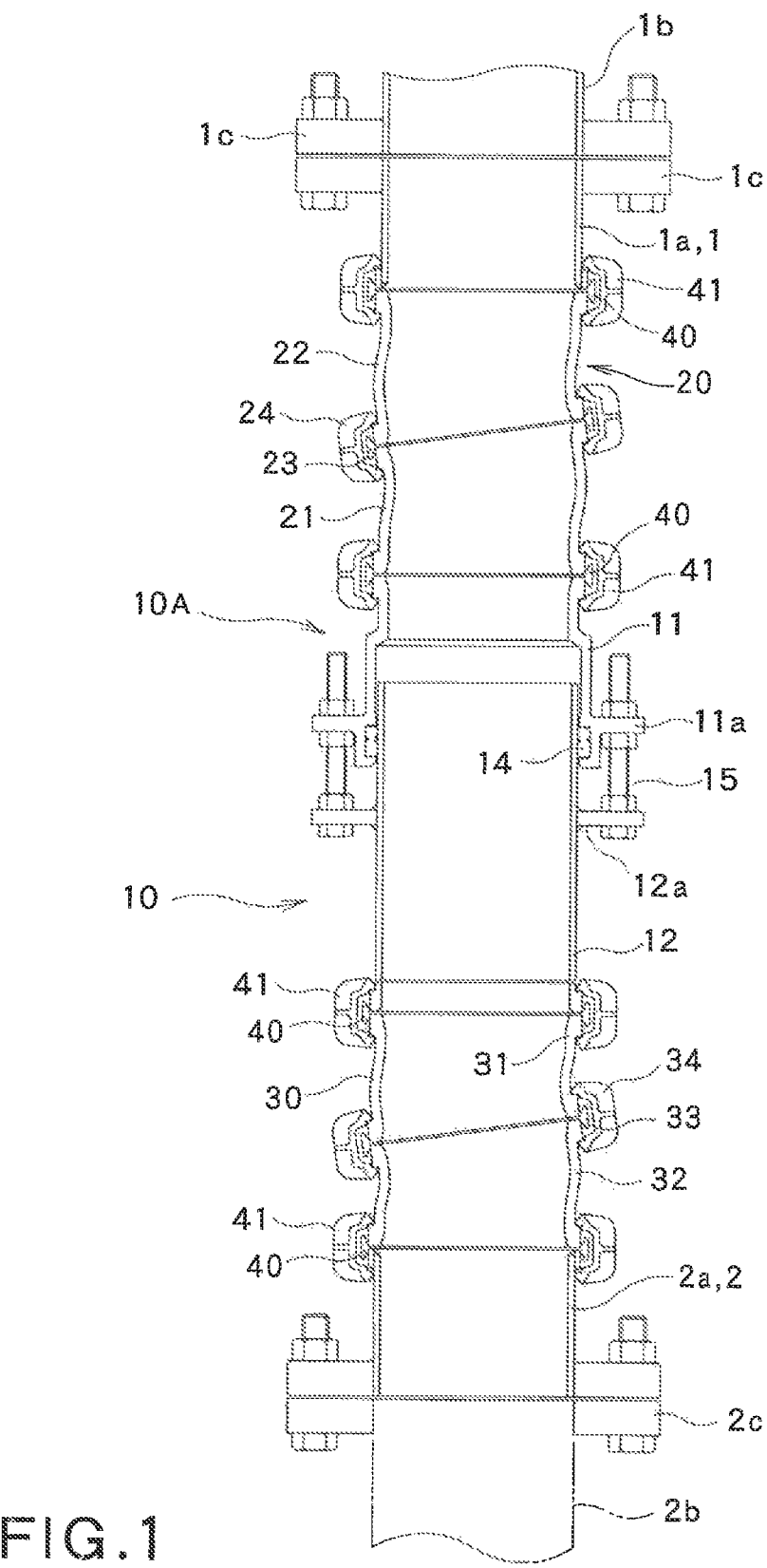
FIG. 1 is a cross-sectional side view of an elbow-equipped expansion joint according to the present invention.
Figure 2A:
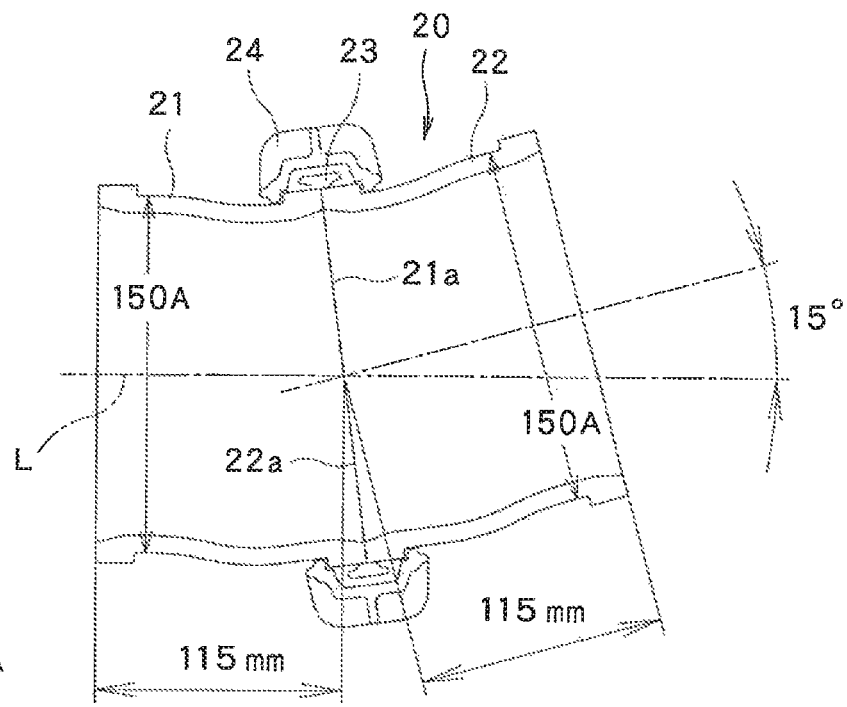
FIG. 2A is a cross-sectional side view of a rotatable elbow.
Figure 2B:
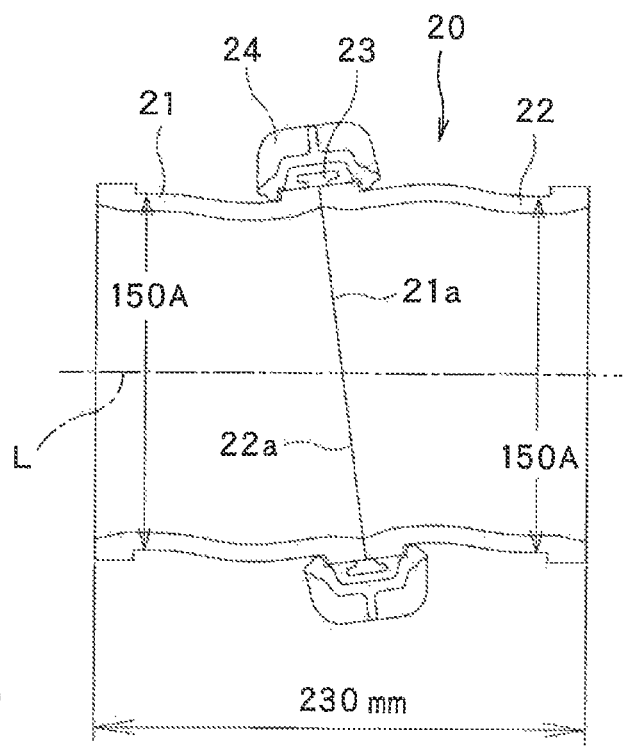
FIG. 2B is a cross-sectional side view of the elbow whose bend angle has changed.
Figure 3:
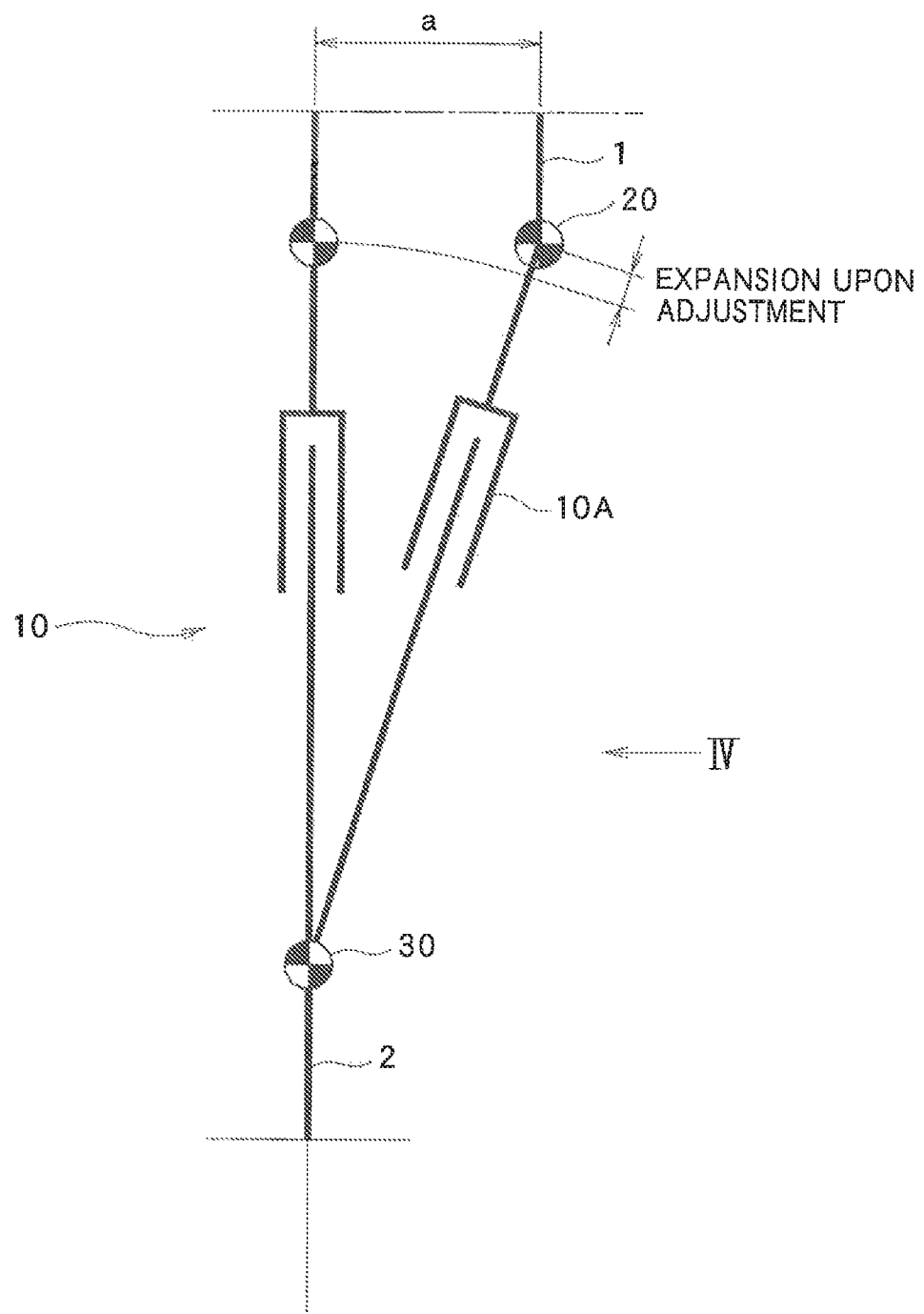
FIG. 3 is a diagram illustrating the operation of the elbow-equipped expansion joint.
Figure 4:
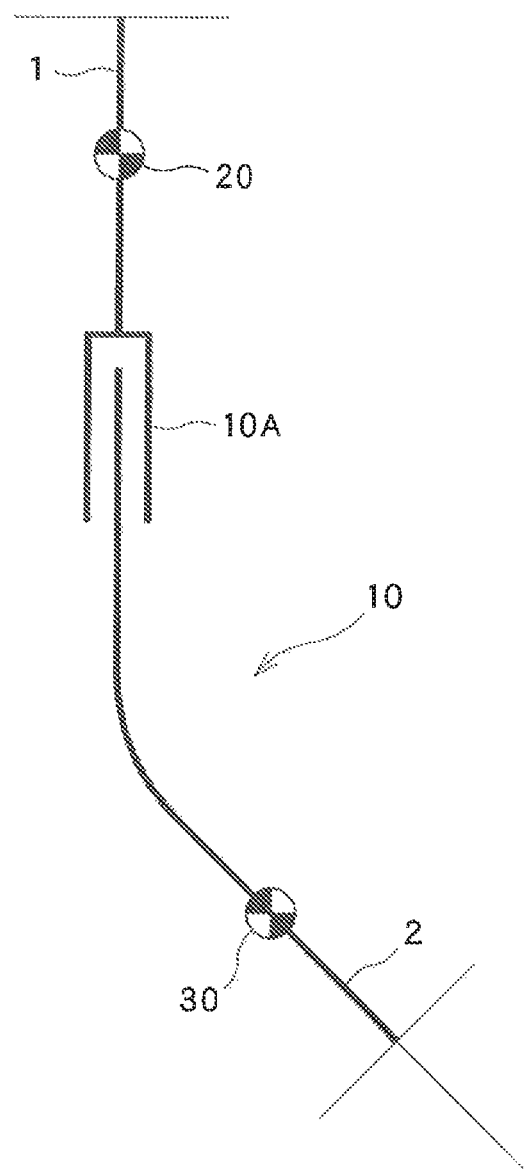
FIG. 4 is a diagram illustrating the operation of the elbow-equipped expansion joint.

FIG. 1 is a cross-sectional side view of the elbow-equipped expansion joint, FIG. 2A is a cross-sectional side view of a rotatable elbow, and FIG. 2B is a cross-sectional side view of the elbow whose bend angle has changed. FIGS. 3 through 5 are diagrams illustrating the action of the elbow-equipped expansion joint.

As shown in FIG. 1 and FIGS. 2A and 2B, the elbow-equipped expansion joint 10 is to connect a first pipe 1 and a second pipe 2.

The first pipe 1 and the second pipe 2, which are existing ones, can sometimes be installed at a position somewhat displaced from a design position in the axial direction and in the lateral direction.

Even when the first pipe 1 and the second pipe 2 are somewhat displaced axially and laterally from a design position, the elbow-equipped expansion joint 10 can connect the first pipe 1 and the second pipe 2 in an appropriate fashion.

The elbow-equipped expansion joint 10 comprises an expandable joint 10A including a first sleeve 11, and a second sleeve 12 which is slidable with respect to the first sleeve 11, and a pair of rotatable elbows 20, 30 joined to both ends of the expandable joint 10A.

As described above, the expandable joint 10A includes the first sleeve 11 having, on its exterior surface, a mounting flange 11a. The second sleeve 12, which is axially slidable with respect to the first sleeve 11, is inserted into the first sleeve 11. The second sleeve 12 has, on its exterior surface, a mounting flange 12a. The first sleeve 11 and the second sleeve 12 are fixed in the circumferential direction and in the axial direction by a plurality of tie bolts 15 mounted to the mounting flanges 11a, 12a along the circumferential direction.

The elbow 20 includes one elbow pipe 21, and the other elbow pipe 22 rotatably joined to the one elbow pipe 21. The bend angle of the elbow 20 can be adjusted by rotating the other elbow pipe 22 with respect to the one elbow pipe 21.

The elbow 30 includes one elbow pipe 31, and the other elbow pipe 32 rotatably joined to the one elbow pipe 31. The bend angle of the elbow 30 can be adjusted by rotating the other elbow pipe 32 with respect to the one elbow pipe 31.

A joining area between the one elbow pipe 21 of the elbow 20 and the other elbow pipe 22 is covered with a first packing 23. The first packing 23 is held by a first housing 24 which surrounds the first packing 23 and which is circumferentially divided. Each division of the first housing 24 is fixed by fixing bolts (not shown).

A joining area between the one elbow pipe 31 of the elbow 30 and the other elbow pipe 32 is covered with a first packing 33. The first packing 33 is held by a first housing 34 which surrounds the first packing 33 and which is circumferentially divided.

Each division of the first housing 34 is fixed by fixing bolts (not shown).

The elbows 20, 30 have the same construction; therefore, the construction of the elbow 20 will be described further below.

As shown in FIGS. 2A and 2B, the elbow 20 includes the one elbow pipe 21, and the other elbow pipe 22. The joining surface 21a of the one elbow pipe 21 and the joining surface 22a of the other elbow pipe 22 are both not perpendicular to the axis L of the one elbow pipe 21, and are inclined with respect to the axis L of the one elbow pipe 21.

Accordingly, the bend angle of the elbow 20 can be changed by rotating the other elbow pipe 22 with respect to the one elbow pipe 21. The bend angle of the elbow 20 is determined by the rotational position of the other elbow pipe 22 with respect to the one elbow pipe 21.

For example, as shown in FIG. 2A, the bend angle of the elbow 20 can be adjusted to a maximum of 15° by rotating the other elbow pipe 22 with respect to the one elbow pipe 21. The bend angle of the elbow 20 can be returned to 0° by rotating the other elbow pipe 22 with respect to the one elbow pipe 21 (see FIG. 2B).

In FIG. 2A, the length of the lower edge of the one elbow pipe 21 is 115 mm, and the length of the lower edge of the other elbow pipe 22 is 115 mm.

In FIG. 2B, the entire length of the one elbow pipe 21 and the other elbow pipe 22 is 230 mm. In FIGS. 2A and 2B, the outer diameter of the one elbow pipe 21 and the other elbow pipe 22 is 150 mm.

As shown in FIG. 1, the one elbow pipe 21 of the elbow 20 is joined to the first sleeve 11, while the other elbow pipe 22 is joined to the first pipe 1. Further, the one elbow pipe 31 of the elbow 30 is joined to the second sleeve 12, while the other elbow pipe 32 is joined to the second pipe 2.

A joining area between the one elbow pipe 21 of the elbow 20 and the first sleeve 11, and a joining area between the other elbow pipe 22 and the first pipe 1 are each covered with a second packing 40. The second packings 40 are each held by a second housing 41 which surrounds the second packing 40 and which is circumferentially divided.

A joining area between the one elbow pipe 31 of the elbow 30 and the second sleeve 12, and a joining area between the other elbow pipe 32 and the second pipe 2 are each covered with a second packing 40. The second packings 40 are each held by a second housing 41 which surrounds the second packing 40 and which is circumferentially divided.

As shown in FIG. 1, the first pipe 1 and the second pipe 2, on the elbow 20 side and on the elbow 30 side, have a short flange pipe 1a and a short flange pipe 2a, respectively. The short flange pipes 1a, 2a are connected to main pipes 1b, 2b via flanges 1c, 2c. The short flange pipe 1a and the main pipe 1b constitute the first pipe 1, while the short flange pipe 2a and the main pipe 2b constitute the second pipe 2.

The operation of the thus-constructed elbow-equipped expansion joint of this embodiment will now be described with reference to FIGS. 3 through 5.

When the existing first and second pipes 1, 2 are displaced from a design position by a distance "a" in the lateral direction, the other elbow pipe 22 of the elbow 20 is rotated with respect to the one elbow pipe 21 to adjust the bend angle of the elbow 20 to a certain angle. Likewise, the other elbow pipe 32 of the elbow 30 is rotated with respect to the one elbow pipe 31 to adjust the bend angle of the elbow 30 to a certain angle. For example, the bend angles of the elbows 20, 30 are set to 15°. Thereafter, the to bend angle 15° is maintained without rotation of the elbows 20, 30.

Further, the second sleeve 12 of the expandable joint 10A is slid with respect to the first sleeve 11 to expand the expandable joint 10A, and the first sleeve 11 and the second sleeve 12 are fixed by the tie bolts 15.

By thus setting an appropriate bend angle of the elbows 20, 30, and expanding the expandable joint 10A, even when the first pipe 1 and the second pipe 2 are laterally displaced by the distance "a" from each other, the elbow-equipped expansion joint 10 can absorb the displacement and securely connect the first pipe 1 and the second pipe 2.

FIG. 4 is a diagram corresponding to FIG. 3 as viewed in the direction of arrow IV. As illustrated, the existing second pipe 2 is pre-bent.

The operation of the elbow-equipped expansion joint 10 will now be described with reference to FIGS. 5A through 5C in the case where the first and second pipes 1, 2 are not displaced from a design position in the lateral direction, but are slightly displaced in the axial direction.

Figures 5A, 5B, 5C:
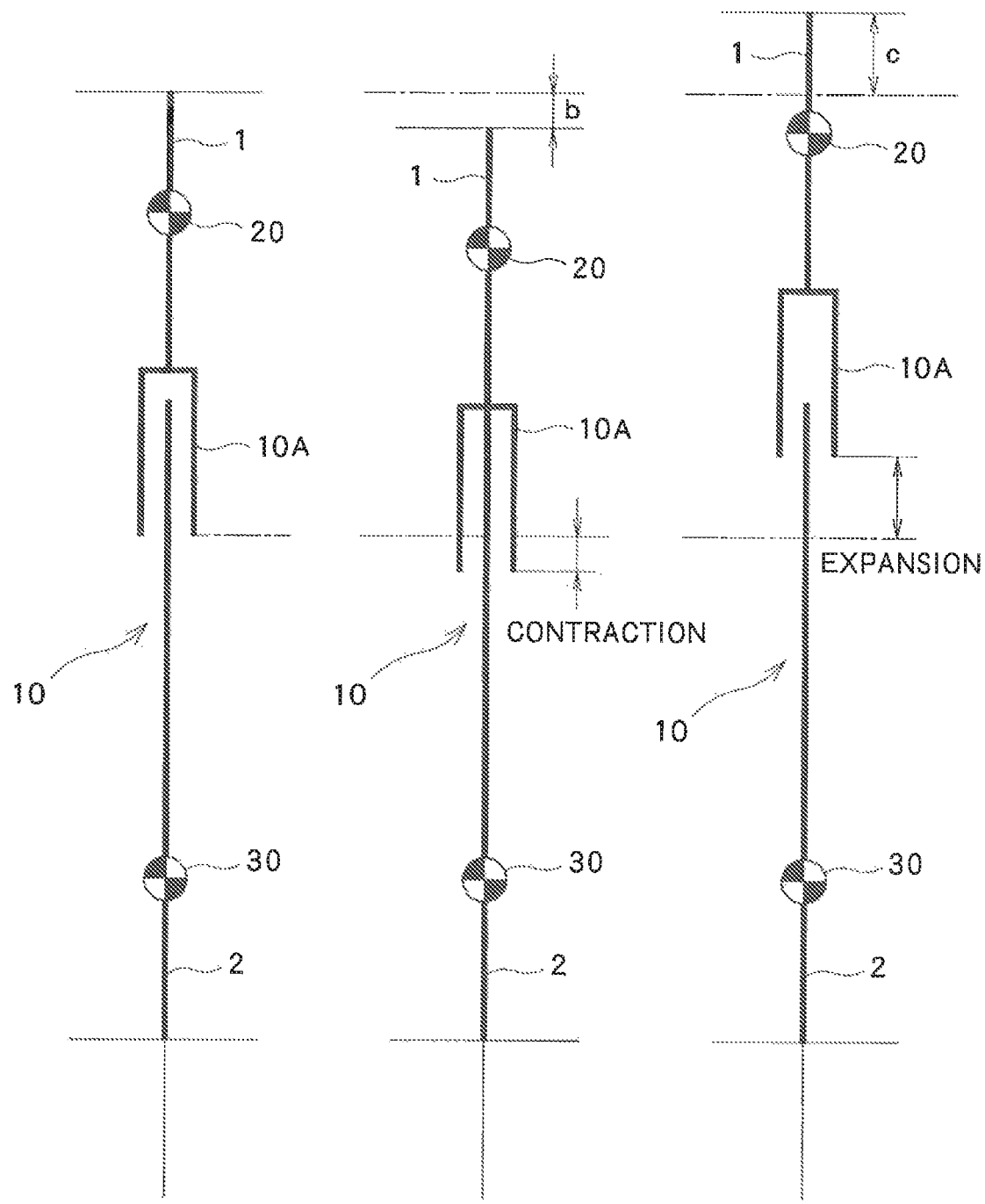
FIGS. 5A through 5C are diagrams illustrating the operation of the elbow-equipped expansion joint.

FIG. 5A illustrates a design position of the first and second pipes 1, 2.

When the first pipe 1 and the second pipe 2 are located closer to each other at a position displaced by a distance "b" in the axial direction as shown in FIG. 5B, the other elbow pipe 22 of the elbow 20 is rotated with respect to the one elbow pipe 21 to adjust the bend angle of the elbow 20 to 0°, and the other elbow pipe 32 of the elbow 30 is rotated with respect to the one elbow pipe 31 to adjust the bend angle of the elbow 30 to 0°.

Next, the second sleeve 12 of the expandable joint 10A is slid with respect to the first sleeve 11 to contract the expandable joint 10A, and the first sleeve 11 and the second sleeve 12 are fixed by the tie bolts 15.

By thus adjusting the bend angles of the elbows 20, 30 to 0°, and contracting the expandable joint 10A, even when the first pipe 1 and the second pipe 12 are axially displaced by the distance "b" from the design position, the elbow-equipped expansion joint 10 can absorb the displacement and securely connect the first pipe 1 and the second pipe 2 (see FIG. 5B).

When the first pipe 1 and the second pipe 2 are located farther away from each other at a position displaced by a distance "c" in the axial direction (see FIG. 5C), the other elbow pipe 22 of the elbow 20 is rotated with respect to the one elbow pipe 21 to adjust the bend angle of the elbow 20 to 0°, and the other elbow pipe 32 of the elbow 30 is rotated with respect to the one elbow pipe 31 to adjust the bend angle of the elbow 30 to 0°.

Next, the second sleeve 12 of the expandable joint 10A is slid with respect to the first sleeve 11 to expand the expandable joint 10A, and the first sleeve 11 and the second sleeve 12 are fixed by the tie bolts 15.

By thus adjusting the bend angles of the elbows 20, 30 to 0°, and expanding the expandable joint 10A, even when the first pipe 1 and the second pipe 12 are axially displaced by the distance "c" from the design position, the elbow-equipped expansion joint 10 can absorb the displacement and securely connect the first pipe 1 and the second pipe 2.

Variations according to the present invention will now be described with reference to FIGS. 6 through 8.

Figure 6A:
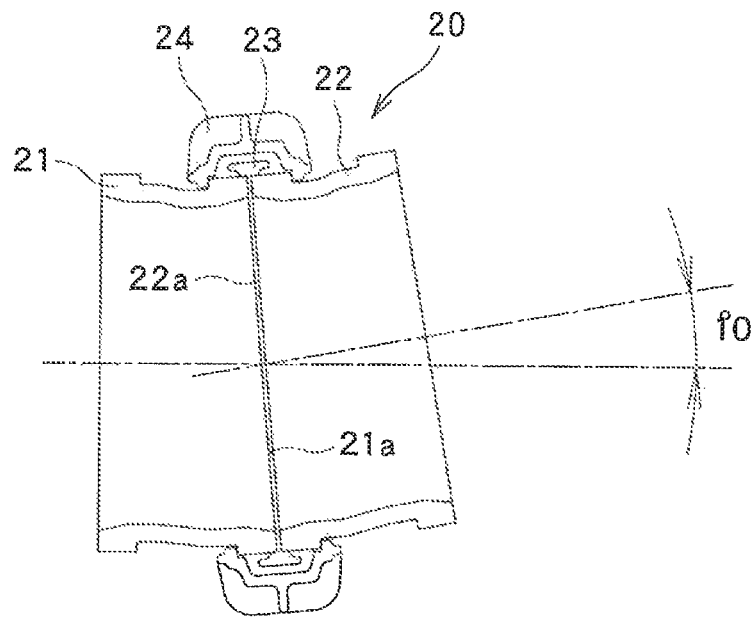
FIGS. 6A and 6B are diagrams showing a variation of the elbow-equipped expansion joint.
Figure 6B:
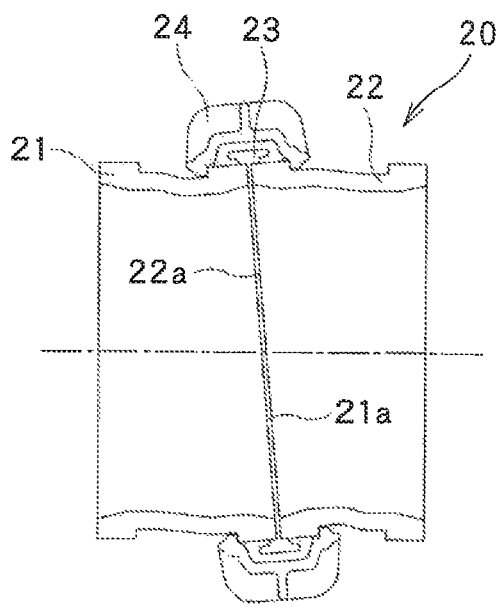
Figure 7A:
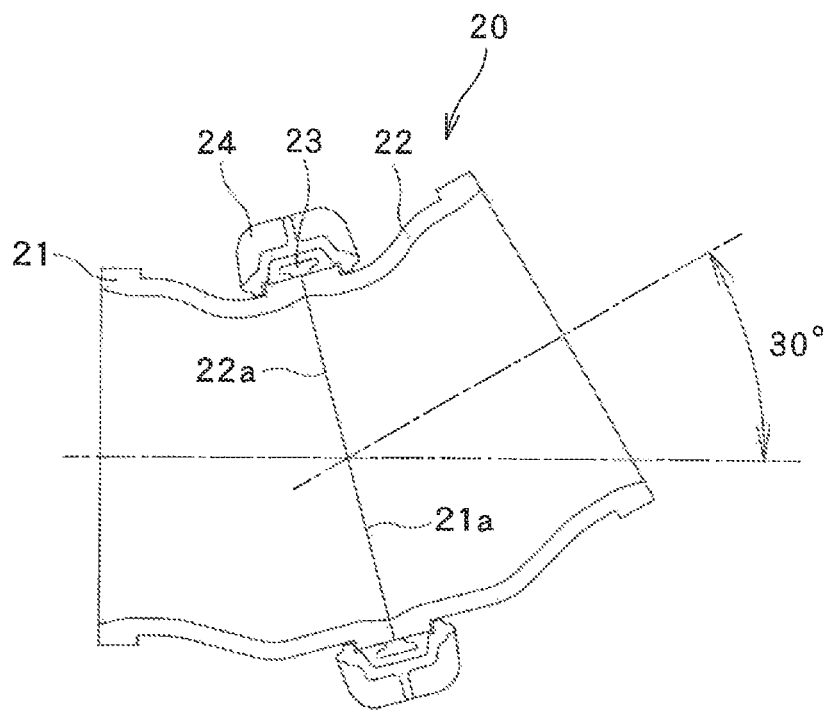
FIGS. 7A and 7B are diagrams showing a variation of the elbow-equipped expansion joint.
Figure 7B:
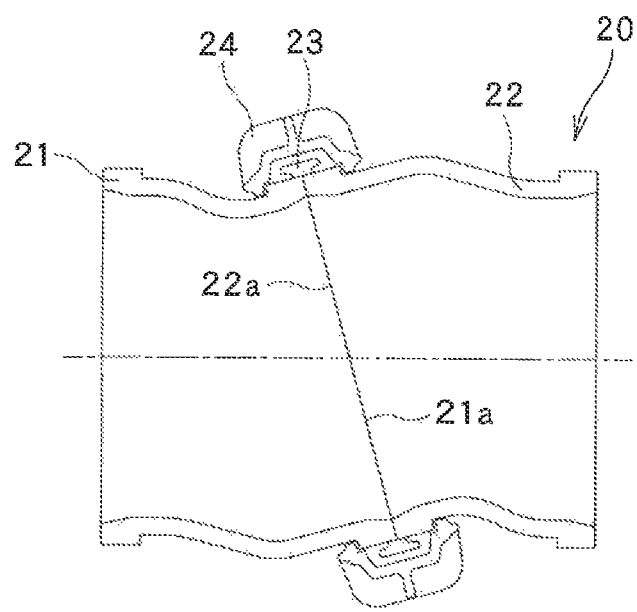
Figure 8A:
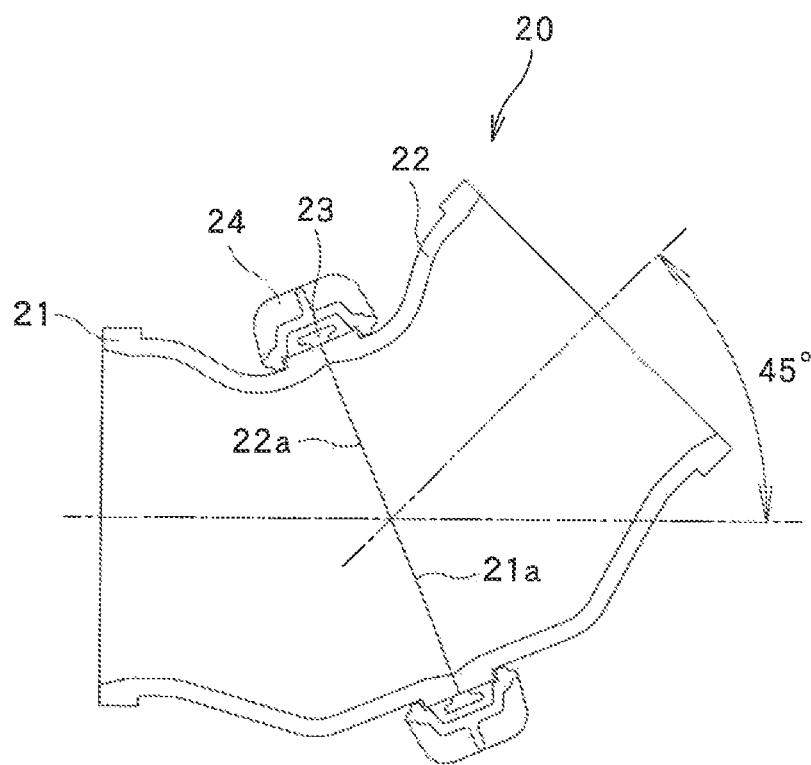
FIGS. 8A and 8B are diagrams showing a variation of the elbow-equipped expansion joint.
Figure 8B:
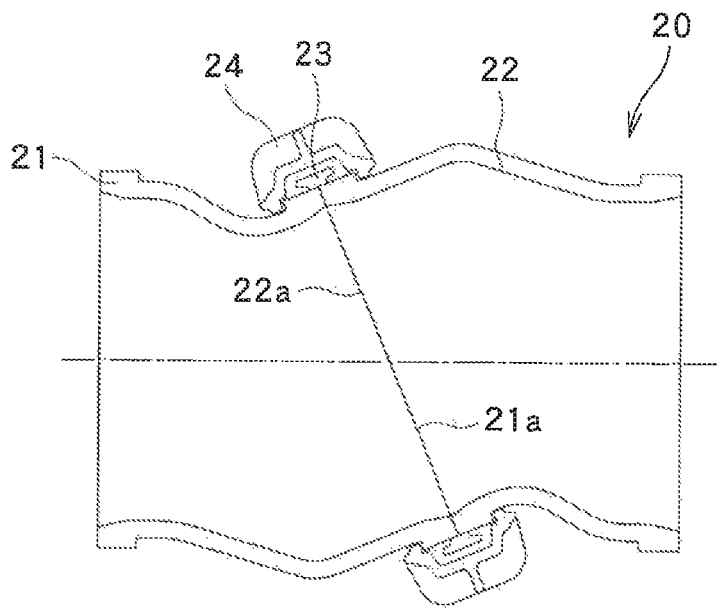

The variations shown in FIGS. 6 through 8 each differ from the embodiment shown in FIGS. 1 through 5 only in the construction of the elbows 20, 30: the other construction of each variation is substantially the same as the above-described embodiment.

In the variations shown in FIGS. 6 through 8, the elbows 20, 30 have the same construction; therefore, only the elbow 20 will be described for convenience sake.

For example, as shown in FIG. 6A, the bend angle of the elbow 20 can be adjusted to a maximum of 10° by rotating the other elbow pipe 22 with respect to the one elbow pipe 21. The bend angle of the elbow 20 can be returned to 0° by rotating the other elbow pipe 22 with respect to the one elbow pipe 21 (see FIG. 66).

Alternatively, as shown in FIG. 7A, the bend angle of the elbow 20 can be adjusted to a maximum of 30° by rotating the other elbow pipe 22 with respect to the one elbow pipe 21. The bend angle of the elbow 20 can be returned to 0° by rotating the other elbow pipe 22 with respect to the one elbow pipe 21 (see

FIG. 7B).

Alternatively, as shown in FIG. 8A, the bend angle of the elbow 20 can be adjusted to a maximum of 45° by rotating the other elbow pipe 22 with respect to the one elbow pipe 21. The bend angle of the elbow 20 can be returned to 0° by rotating the other elbow pipe 22 with respect to the one elbow pipe 21 (see FIG. 86).

DESCRIPTION OF THE SYMBOLS 1 first pipe
2 second pipe
10 elbow-equipped expansion joint
10A expandable joint
11 first sleeve
12 second sleeve
15 tie bolt
20 elbow
21 one elbow
22 other elbow
30 elbow
31 one elbow
32 other elbow

The invention claimed is:

1. An elbow-equipped expansion joint comprising:
an expandable joint including a first sleeve, and a second sleeve which is slidable with respect to the first sleeve, the first sleeve and the second sleeve being capable of being fixed by fixing bolts that connect the first sleeve and the second sleeve; and
rotatable elbows joined to both ends of the expandable joint, each elbow including a first elbow pipe, and a second elbow pipe rotatably joined to the first elbow pipe, wherein:
each of the first elbow pipe and the second elbow pipe has a respective joint surface that is inclined with respect to an axis of the first elbow pipe,
a bend angle of each elbow is determined by a rotational position of the second elbow pipe with respect to the first elbow pipe, and
a bend angle of each elbow is configured to be changed by rotating the first elbow pipe with respect to the second elbow pipe, while sliding a first joint surface of the first elbow pipe on a second joint surface of the second elbow pipe.

2. The elbow-equipped expansion joint according to claim 1, wherein a joining area between the first elbow pipe of each elbow and the second elbow pipe is covered with a first packing which is held by a dividable first housing.

3. The elbow-equipped expansion joint according to claim 2, wherein a joining area between the expandable joint and each elbow is covered with a second packing which is held by a dividable second housing.

4. The elbow-equipped expansion joint according to claim 1, wherein a joining area between the expandable joint and each elbow is covered with a second packing which is held by a dividable second housing.

5. The elbow-equipped expansion joint according to claim 1, wherein the first elbow pipe and the second elbow pipe each comprise a bend.

* * * * *